(12) United States Patent
Cebon et al.

(10) Patent No.: US 9,404,602 B2
(45) Date of Patent: Aug. 2, 2016

(54) ELECTROMAGNETIC FLEXURE

(71) Applicants: Cambridge Enterprise Limited, Cambridge (GB); Camcon Technology Ltd., Cambridgeshire (GB); Haldex Brake Products Ltd., Worcestershire (GB)

(72) Inventors: David Cebon, Cambridge (GB); Andrews Odhams, Guildford (GB); Neil Houghton, Norfolk (GB); Wladyslaw Wygnanski, Cambridge (GB); Jonathan Miller, Cambridge (GB); Robert D. Prescott, Solihull (GB); Leon M. Henderson, Cambridge (GB); Laurence J. Potter, Birmingham (GB)

(73) Assignees: Cambridge Enterprise Limited, Cambridge (GB); Camcon Technology Ltd., Cambridge, Cambridgeshire (GB); Haldex Brake Products Ltd., Lindley, Warwickshire (GB)

( * ) Notice: Subject to any disclaimer, the term of this patent is extended or adjusted under 35 U.S.C. 154(b) by 97 days.

(21) Appl. No.: 14/204,550

(22) Filed: Mar. 11, 2014

(65) Prior Publication Data

US 2015/0260303 A1 Sep. 17, 2015
US 2016/0091106 A9 Mar. 31, 2016

Related U.S. Application Data

(63) Continuation of application No. PCT/GB2012/052241, filed on Sep. 12, 2012.

(30) Foreign Application Priority Data

Sep. 12, 2011 (GB) .................................. 1115726.0

(51) Int. Cl.
*F16K 11/044* (2006.01)
*F16K 31/08* (2006.01)
*F16K 31/06* (2006.01)

(52) U.S. Cl.
CPC ............. *F16K 31/082* (2013.01); *F16K 11/044* (2013.01); *F16K 31/0627* (2013.01); *F16K 31/0682* (2013.01)

(58) Field of Classification Search
None
See application file for complete search history.

(56) References Cited

U.S. PATENT DOCUMENTS

| 4,446,889 A | * | 5/1984 | Sakakibara | ......... F16K 31/0624 137/625.4 |
| 4,574,841 A | * | 3/1986 | Hugler | .................. F16K 31/082 137/596.17 |

(Continued)

FOREIGN PATENT DOCUMENTS

| DE | 19611517 A1 | 9/1997 |
| DE | 29824475 U1 | 3/2001 |
| GB | 852171 A | 10/1960 |

OTHER PUBLICATIONS

International Search Report in International Application No. PCT/GB2012/052241, mailed Nov. 15, 2012.

*Primary Examiner* — John Fox
(74) *Attorney, Agent, or Firm* — Edell, Shapiro & Finnan LLC

(57) ABSTRACT

An electromagnetic valve comprises a yoke, a magnet having pole pieces defining a gap, a flexure assembly having one end attached to the yoke such that part of the flexure assembly extends into the gap, and a mechanism configured to polarize the magnetizable portion so that the extending part of the flexure assembly is attracted towards a pole piece by a magnetic force, thereby defining a valve state. The flexure assembly has at least one resilient portion and at least one magnetizable portion, wherein the extending part of the flexure assembly is movable between the pole pieces through an intermediate position towards which it is resiliently biased such that a resilient mechanical force is generated by deflecting the resilient portion from an undeflected position. The magnetizable portion and the resilient portion are configured such that the magnetic force defining the valve state is greater than the resilient mechanical force.

18 Claims, 14 Drawing Sheets

(56) References Cited

U.S. PATENT DOCUMENTS

| | | | | |
|---|---|---|---|---|
| 4,685,652 A * | 8/1987 | Shopsky | ............... | F16K 31/002 137/550 |
| 6,145,806 A * | 11/2000 | Dettmann | ............... | F16K 31/06 137/625.44 |
| 6,371,160 B2 * | 4/2002 | Dettmann | ................ | 137/596.17 |
| 6,394,136 B1 * | 5/2002 | Rohrbeck | ............. | F16K 11/052 137/625.44 |
| 6,935,373 B2 | 8/2005 | Wygnanski | | |
| 8,777,181 B2 * | 7/2014 | Scheibe | ................ | F16K 11/044 251/129.16 |
| 2015/0192218 A1 * | 7/2015 | Arend | ................. | F16K 31/0627 137/625.4 |

* cited by examiner

| Parameter | Specification |
|---|---|
| Orifice diameter (mm) | 8-9 |
| PWM frequency (Hz) | 50 |
| Minimum duty cycle (%) | 15 |
| Total time to open (ms) | 3 |
| Supply pressure (bar) | 12.5 |
| Delivery pressure (bar) | 10 |
| Environment | -40°C to +80°C, water, oil, salt |

ELECTROMAGNETIC FLEXURE

CROSS REFERENCE TO RELATED APPLICATIONS

This application is a continuation of International Application No. PCT/GB2012/052241, filed on Sep. 12, 2012, entitled "Electromagnetic Flexure," which claims priority under 35 U.S.C. §119 to Application No. GB 1115726.0 filed on Sep. 12, 2011, entitled "Electromagnetic Flexure," the entire contents of which are hereby incorporated by reference.

FIELD OF THE INVENTION

The present invention generally relates to electromagnetically operated devices, or actuators of the type which use a magnetic field to move an armature or flexure from one position to another. More specifically, the present invention concerns the flexure for a binary actuated valve suitable for applications such as fluid flow control.

BACKGROUND

There are many types of electromagnetically operated devices or actuators which are currently used to control switch contacts and provide an open, closed, or changeover functionality. Typical examples of such devices include those which use the movement of the flexure or cantilever to open and/or close valves controlling a flow of fluid. Many such valves require a continuous electric current to hold the armature in one position or the other. This wastes energy and can produce unwanted heat. To avoid using a continuous flow of electric current, binary actuated valves have been developed such as that of the type disclosed in U.S. Pat. No. 6,935,373.

Existing binary valves of the type disclosed in U.S. Pat. No. 6,935,373 operate bi-stably in either the fully-open or fully-closed states, using permanent magnets to hold the valve in each state. To change the state of the valve, a single short electrical pulse is sent to the coil to reduce, remove, or reverse the attractive magnetic force, causing the valve to switch states with the help of a mechanical spring. Such a valve can be controlled using a pulse width modulation (PWM) transistor-transistor logic (TTL) signal, with an edge-detection circuit sending actuating pulses to the coil in response to the edges of the PWM signal.

In many applications, it is desirable to have valves that can pass large flow rates and switch with short time delays despite high pressure differentials across the seal. One such application is pneumatic control of truck brakes. In this application, it is desirable that valves have effective orifice diameters of up to 9 mm and switching times of 3 ms. Furthermore, pressure differentials across the valve can be up to 12.5 bar. This combination of performance parameters is not achievable with conventional valve technologies, which tend to have switching times longer than 15 ms.

Typical existing binary valves, such as that shown in FIG. 1, achieve switching times shorter than 4 ms with a 9 bar pressure differential, but only for effective orifice diameters smaller than 3.5 mm. Such performance is sufficient in applications where fast and small pressure adjustments are required. However, many applications require higher pressures, flow rates, and switching speeds.

The valve according to the present invention has been developed to overcome the limitations of previous binary valves, such that it would achieve specifications suitable for pneumatic brake actuation when placed directly on the brake chamber. This requires changes in the pressure in the chamber greater than 0.5 bar at 12.5 Hz with a supply pressure of 12.5 bar.

SUMMARY

According to the present invention, there is provided an electromagnetic valve comprising: a yoke; a magnet having pole pieces defining a gap; a flexure assembly having one end attached to the yoke, such that part of the flexure assembly extends into the gap, the flexure assembly having at least one resilient portion formed of a resilient material and at least one magnetizable portion, wherein that part of the flexure assembly that extends into the gap is movable between the pole pieces through an intermediate position towards which it is resiliently biased such that a resilient mechanical force is generated by deflecting the resilient portion from an undeflected position; and a mechanism configured to polarize the magnetizable portion of the flexure assembly so that the part of the flexure assembly that is movable between the pole pieces is attracted towards a pole piece by a magnetic force, thereby defining a valve state; wherein the magnetizable portion and the resilient portion of the flexure assembly are configured such that the magnetic force defining the valve state is greater than the resilient mechanical force; wherein the magnetizable portion of the flexure assembly comprises elements of magnetizable material, wherein each element comprises regions of reduced permeability separating the elements from the resilient portion, and wherein the elements of magnetizable material do not contribute significantly to the resilient mechanical force.

Designing the flexure assembly for a binary valve involves a tradeoff between several variables. In order to handle high pressure, the flexure assembly stiffness needs to be high. Although raising the stiffness also increases the speed of response of the valve, a stiff flexure assembly experiences higher stresses at the root of the cantilever. In addition, the attractive magnetic force, or "pull force," must overcome the flexure stiffness as the flexure assembly approaches its end stop during valve switching. This requires a large magnetic flux to flow through the flexure assembly, implying a large cross-sectional area.

Ordinary flexure assemblies for binary valves tend to be rectangular in cross-section, and are designed to balance the conflicting requirements mentioned in the previous paragraph. However they can only pass a limited magnetic flux, reducing the maximum switching pressure. By including a magnetizable portion and the resilient portion as defined above, the present invention uniquely separates the magnetic functionality of the flexure from the mechanical functionality, creating more leeway in the design process and allowing higher levels of performance to be achieved.

In preferred embodiments, the magnetizable portion comprises elements of magnetizable material, for example, "fingers," such that at least one end of each element comprises regions of reduced permeability separating the elements from the resilient portion. These elements of magnetizable material may or may not be separate parts from the resilient portion. The separation of the elements of magnetizable material allows the flexure assembly to bend without interference from the elements, but also allows the magnetic flux to flow along the elements and across small regions of reduced permeability at one or more ends of the elements.

The flexure assembly may consists of a single part as shown for example in FIGS. 10a and 10b described below. Examples of flexure assemblies consisting of more parts will be given for example in FIGS. 10c and 10d described below. Hereafter, the terms "flexure" and "flexure assembly" are used interchangeably.

BRIEF DESCRIPTION OF THE DRAWINGS

Examples of devices according to the present invention will now be described with reference to the accompanying drawings, in which.

DETAILED DESCRIPTION

Figure 1A:
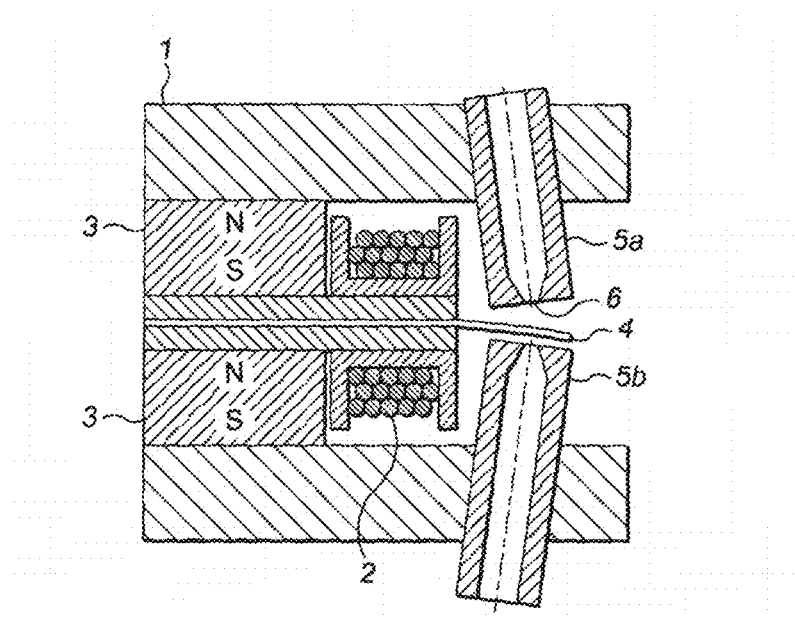
FIGS. 1A and 1B respectively show a schematic of an existing binary actuated valve with a 1.75 mm diameter orifice, and an overlaid diagram of the relevant magnetic circuit model.
Figure 1B:
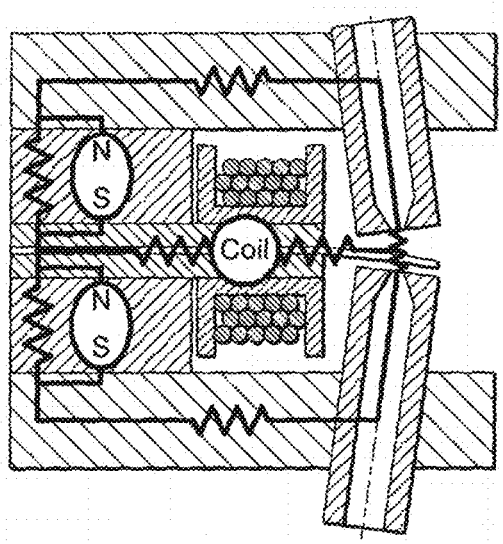

FIGS. 1A and 1B show an existing binary actuated valve comprising a steel frame 1, a coil 2 and strong permanent magnets 3. The only moving part of the valve is a flexure 4, which is a cantilever that is held bi-stably against either one of two pole-pieces 5a; 5b via the permanent magnets 3. The steel frame transfers the magnetic flux from the permanent magnets 3 to the pole-pieces 5a; 5b. Alternatively, the permanent magnets 3 may be placed in series with the pole-pieces 5a; 5b.

When the flexure 4 is held against the bottom pole-piece 5b, it blocks an orifice 6 and the valve is therefore closed. The diameter of the orifice 6 in this existing valve is 1.75 mm. When the flexure 4 is held against the top pole-piece 5a, the valve is fully open. To get the flexure 4 to switch states, a brief electrical pulse is sent to the coil 2 to reduce, remove, or reverse the attractive magnetic force which, combined with the mechanical stiffness of the flexure 4, pulls the flexure 4 to the opposite state. The flexure 4 stores some of the kinetic energy that would ordinarily be lost in a conventional solenoid valve, converting the kinetic energy to potential energy as the flexure 4 reaches the opposite pole-piece 5a or 5b. This also softens the landing of the flexure 4, increasing the longevity of the hardware.

FIGS. 2A to 2D schematically represent four general stages that can be identified during the switching of a binary actuated valve:

A) Pulling the flexure to its seat;
B) Sealing;
C) Releasing the flexure from its seat; and
D) Flexure switching.

The four stages are described in more detail below. It is assumed that the valve is submerged in a high pressure reservoir (not shown), and that a low pressure reservoir (also not shown) is attached to its orifice 6. Therefore, the pressure force tends to help seal the valve once it is closed. Note, however, that it is possible to configure the valve so that the pressure force tends to open the valve rather than tending to close it.

Figure 2A:
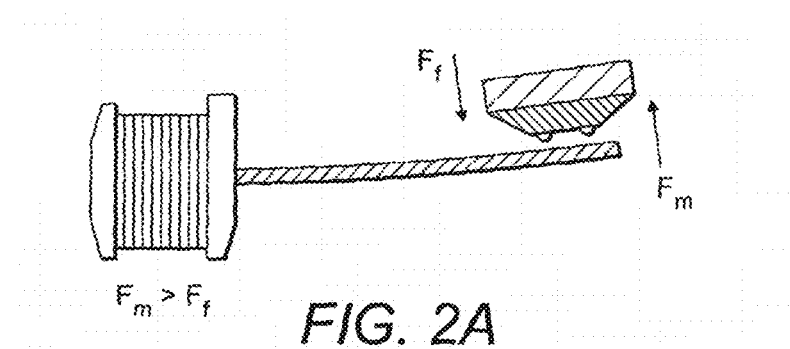
FIGS. 2A to 2D show four general stages that can be identified during the switching of a binary actuated valve.

A) The first stage of valve switching is shown in FIG. 2A. A magnetic force, $F_m$, opposes an elastic flexure force, $F_f$, to pull the flexure to its seat. Considering a flexure of rectangular cross-section, $F_f$ can be approximated by:

$$F_f = \frac{3E_f \left[\frac{b_f t_f^3}{12}\right] \delta}{L_f^3} \tag{1}$$

where $\delta$ is the cantilever deflection from its neutral point at the center of its throw, $E_f$ is the Young's Modulus of the flexure material, $b_f$ is the width of the flexure, $t_f$ is its thickness, and $L_f$ is the cantilever length of the force application. The magnetic force is often simplified to be $$F_m = \frac{B_a^2 A_a}{2\mu_o} \tag{2}$$

where $B_a$ is the magnetic flux density in the air between the flexure and the pole-pieces, $A_a$ is the characteristic area of the air gap, and $\mu_o$ is the permeability of free space, which equals $4\pi \times 10^{-7}$ N/A$^2$.

Figure 2B:
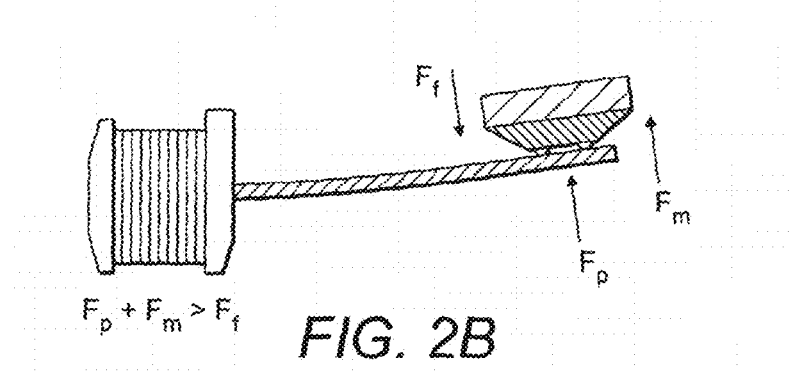

B) The second stage of valve switching is shown in FIG. 2B. Once the flexure 4 touches the orifice 6, the air pressure force, $F_p$, helps the magnetic force in compressing the flexure against the seat, sealing off the orifice. The pressure force is given by:

$$F_p = \pi(P_H - P_L)\left(\frac{d_o}{2}\right)^2 \tag{3}$$

where $P_H$ and $P_L$ are the pressures in the high- and low-pressure reservoirs respectively, and $d_o$ is the effective diameter of the orifice.

Figure 2C:
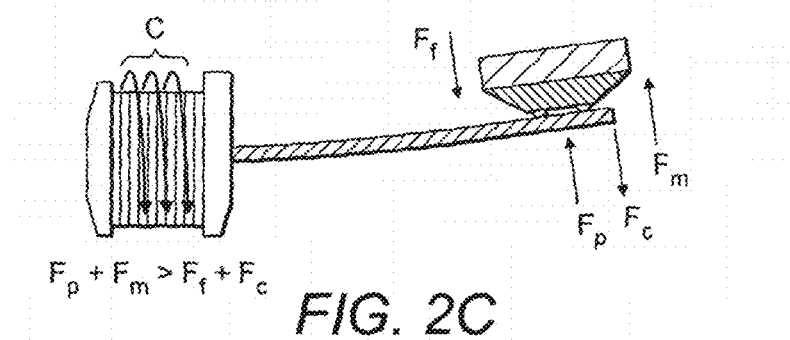

C) The third stage of valve switching is shown in FIG. 2C. A solenoid coil has to be actuated to modify the magnetic force sufficiently such that $F_p + F_m < F_f + F_c$, where $F_c$ is the "coil force," which is used as an illustrative force at this point in the explanation. Preferably, the actuated coil completely negates the magnetic force, allowing the entire flexure force to overcome the pressure force. The influence of the coil can be described approximately by:

$$F_c \alpha [i_c^2 N_c^2] f(\delta) \tag{4}$$

where $N_c$ is the number of coil turns, $i_c$ is the current C (indicated by arrows) in the coil, and $f(\delta)$ is represents a function of the flexure position.

Figure 2D:
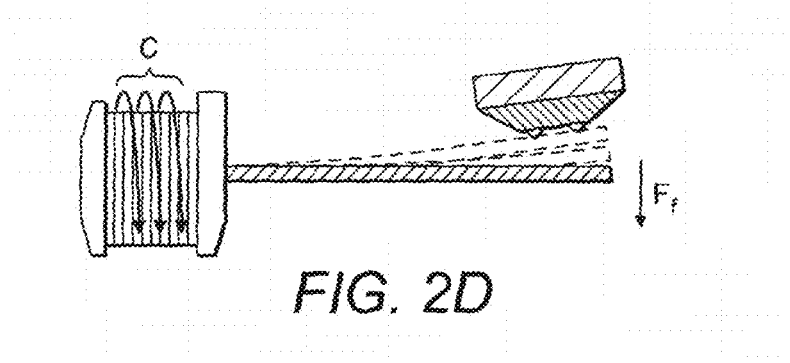

D) The final stage of valve switching is shown in FIG. 2D. It is assumed that once the flexure 4 is lifted from the orifice, a pressure balance occurs such that there is no pressure force on the flexure. In addition, it is assumed that the pull force from the magnets is completely eliminated by the influence of the coil. In this case, the flexure's motion is dominated by free vibration at its fundamental resonant frequency, $f_n$, which for a rectangular cantilever is given by:

$$f_n = \frac{3.52}{2\pi}\sqrt{\frac{E_f\left[\frac{b_f t_f^3}{12}\right]}{\rho_f b_f t_f L_f^4}} \tag{5}$$

where $\rho_f$ is the density of the flexure material. It is acknowledged that the actual flexure motion is influenced by imbalances between the magnetic and coil forces, by second order effects of the pressure, and by variation of the geometry of the flexure.

Figure 3:
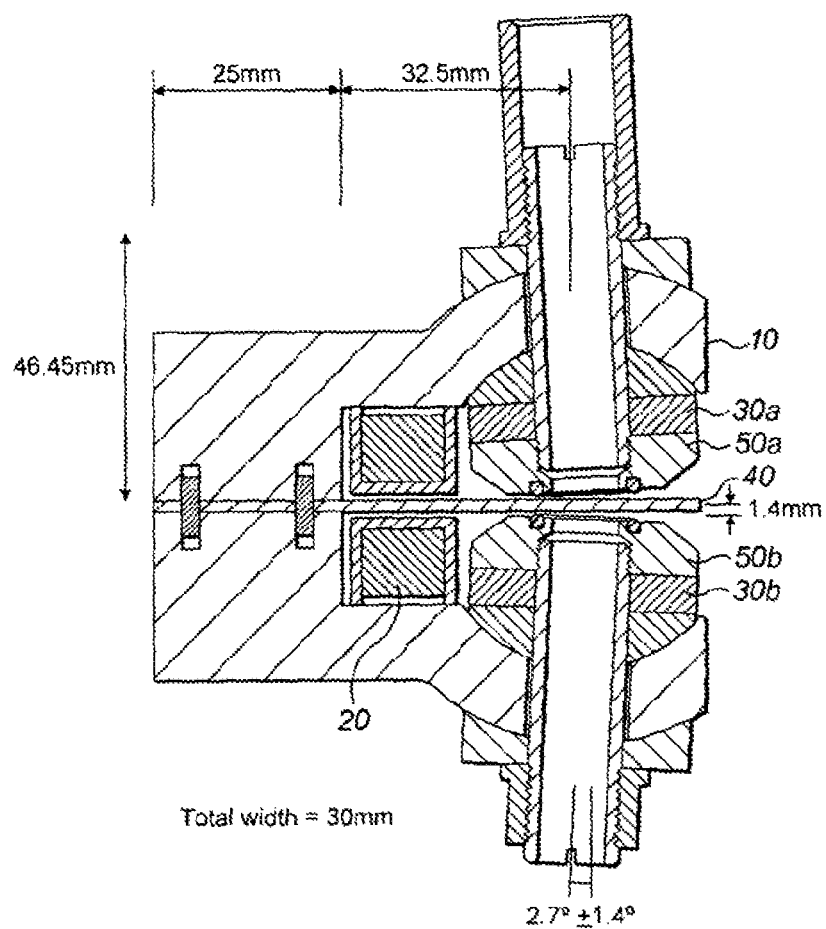
FIG. 3 shows a binary actuated valve according to the present invention.
Figure 3:
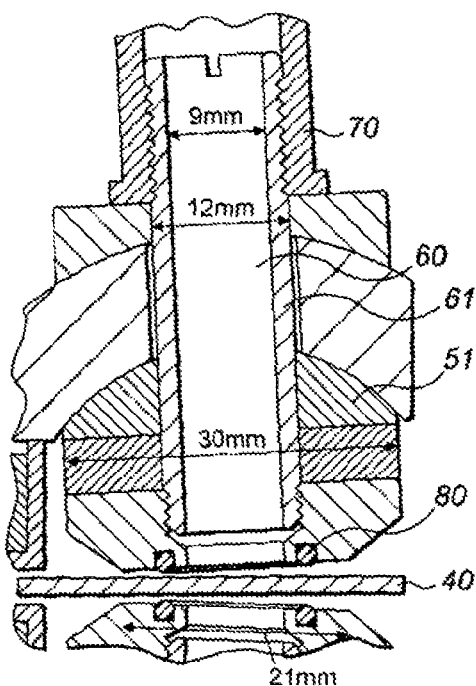
Figures 4, 5:
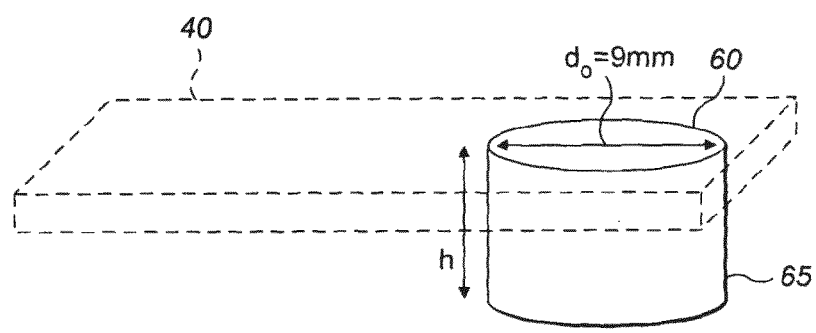
FIG. 4 lists the preferred specifications of a high-performance pneumatic brake valve according to the present invention.
FIG. 5 is a schematic drawing of a flexure in a binary valve.

An embodiment of a binary valve according to the present invention (except for the flexure) is shown in FIG. 3. A summary of the preferred specifications for the binary actuated valve according to the present invention is given in the table of FIG. 4. The reasoning behind these specifications is explained in more detailed below. It will be appreciated that the parameters given in FIG. 4 represent the optimal values determined by the inventors, and that the present invention is not restricted to the nominal parameters given in this example.

The minimum diameter for a binary actuated valve for a pneumatic ABS system, according to the present invention, is 8 mm, with a preferred diameter of 9 mm. Such diameters are large enough to pass air flows that are sufficient to track the demand pressure variations during a slip-controlled stop on a rough surface.

Typical frequencies of body-bounce and wheel-hop for heavy vehicles tend to be in the range of 3 Hz and 12.5 Hz respectively. The PWM frequency requirement may be determined based on the Nyquist sampling theorem known in the art. With this theorem, assuming a safety factor of 2, the PWM frequency of the pneumatic valves is required to be 50 Hz in order to follow oscillating pressure demands to reject both wheel-hop and body-bounce.

Existing pneumatic brake systems can achieve pressure control accuracies of 0.1-0.2 bar. To improve on this, the target accuracy of the new valves is set as 0.05 bar. It is further specified that this accuracy should be achieved within a settling time of 200 ms. Using gain values of at least 3, assuming a PWM frequency of 50 Hz, and constraining the range of mark-space ratios to reach as low as 15%, a valve according to the present invention would have to take less than 3 ms to change states. Mechanical motion was previously observed to take up half the switching time of the valve, and, since the mechanical motion constitutes half a period of free vibration, then the required 3 ms reaction time of the valve means that the flexure must have a natural frequency greater than $1/(0.003\text{ s}) = 333$ Hz.

The binary actuated valve according to the present invention was designed to fulfil the criteria tabulated in FIG. 4 and described above. It will be appreciated, however, that the present invention is not limited to the nominal values, but that these values are the preferred ones for this application of the valve technology.

FIG. 5 is a schematic drawing of a "flat," rectangular flexure 40 in a binary valve having an orifice 60 of 9 mm in diameter. When the flexure is deflected, a cylinder of space 65 is created between the orifice 60 and the flexure 4. The surface area of the side of the cylinder needs to be greater than the orifice surface area so as not to impede the flow. In other words, $$\pi d_0 h > \frac{\pi d_0^2}{4} \tag{6}$$

where h is the height of the cylinder.

The valve according to the present invention was also designed to have a theoretically infinite service life, based on an endurance limit of 40% of the ultimate strength of the material, $\sigma_u$. The stress will be largest at the root of the flexure, and is calculated for an example rectangular flexure 40 using:

$$\sigma_f = \frac{3\delta E_f t_f}{2L_f^2} \tag{7}$$

Returning to FIG. 3, the valve comprises a mild-steel C-frame, or yoke 10, which has two parts so that different metals could be used for the flexure 40 and the yoke 10. It will be appreciated that the yoke 10 may come in different shapes, some of which are described below. However, the valve could also be made as one piece, multiple pieces, or variants of the number of pieces shown in FIG. 3. Preferably, the "neck" of the yoke 10 (the portion of the yoke between the section within which the flexure 40 is clamped and the section that is connected to a magnet and a pole-piece) is large enough to prevent bottlenecking the flux flow, and ample space is made available around the flexure 40 for a solenoid coil 20. Strong magnets 30a; 30b, such as neodymium-iron-boron (NdFeB) magnets, are placed next to bright mild steel pole-pieces 50a; 50b. However, the magnets could be placed in alternative locations that are in series with the pole-pieces 50a; 50b as well, such as at the back of the valve or on the necks of the valve.

Preferably, the pole-pieces 50a; 50b are conical to "focus" the flux, thereby increasing the magnetic hold force. An orifice 60 may be housed in non-magnetic through-tubes 61 that are screwed and fixed by lock nuts into the pole-pieces 50a; 50b to hold them against the magnets 30 and yoke 10. A packer 51 may also be used so that the flat face of a standard toroidal magnet with a rectangular cross-section can be mated to a yoke whose face is not flat, facilitating angular adjustments of the pole-piece assembly such that the flexure sits flat on a pole-piece face when deflected.

Intuitively, one would think that the flexure stiffness should be driven to its maximum to achieve the maximum $F_f$ and $f_n$ through equations (1) and (5). However, this would raise the stress at the root of the cantilever, as illustrated by equation (7). Moreover, although equations (2) and (4) suggest the magnetic circuit in the valve is independent of the valve mechanics, these equations are only first order approximations. In reality, only a finite amount of magnetic permeability is available in a material, constraining the amount of flux that can be transmitted by the flexure. This attractive magnetic force must overcome the flexure stiffness during the first stage of valve switching, when the flexure 40 deflects to the opposite pole-piece to provide the appropriate opening area according to equation (6). It follows that the flexure stiffness must be small enough that the limited magnetic attraction available will hold the flexure against either pole-piece.

The flexure 40 in the example embodiment according to the present invention shown in FIG. 3 has a thickness of 1.4 mm and a width of 30 mm. A coil 20 may be wrapped around the flexure 40 using a plastic coil former that features an inner cut-out large enough to permit free motion of the flexure 40 throughout its travel. Rubber O-rings 80 may be used to create a seal between the flexure 40 and the pole-pieces 50$a$; 50$b$. The example embodiment of a valve shown in FIG. 3 preferably accommodates an O-ring 80 with $d_s$=1.6 mm, $D_s$=12.1 mm, and a compression of up to 0.24 mm. However other sealing arrangements are possible, with the flexible surface located on the flexure 40, or with the flexible surface located some distance away from the pole piece using a linkage connected to the flexure.

Figure 6:
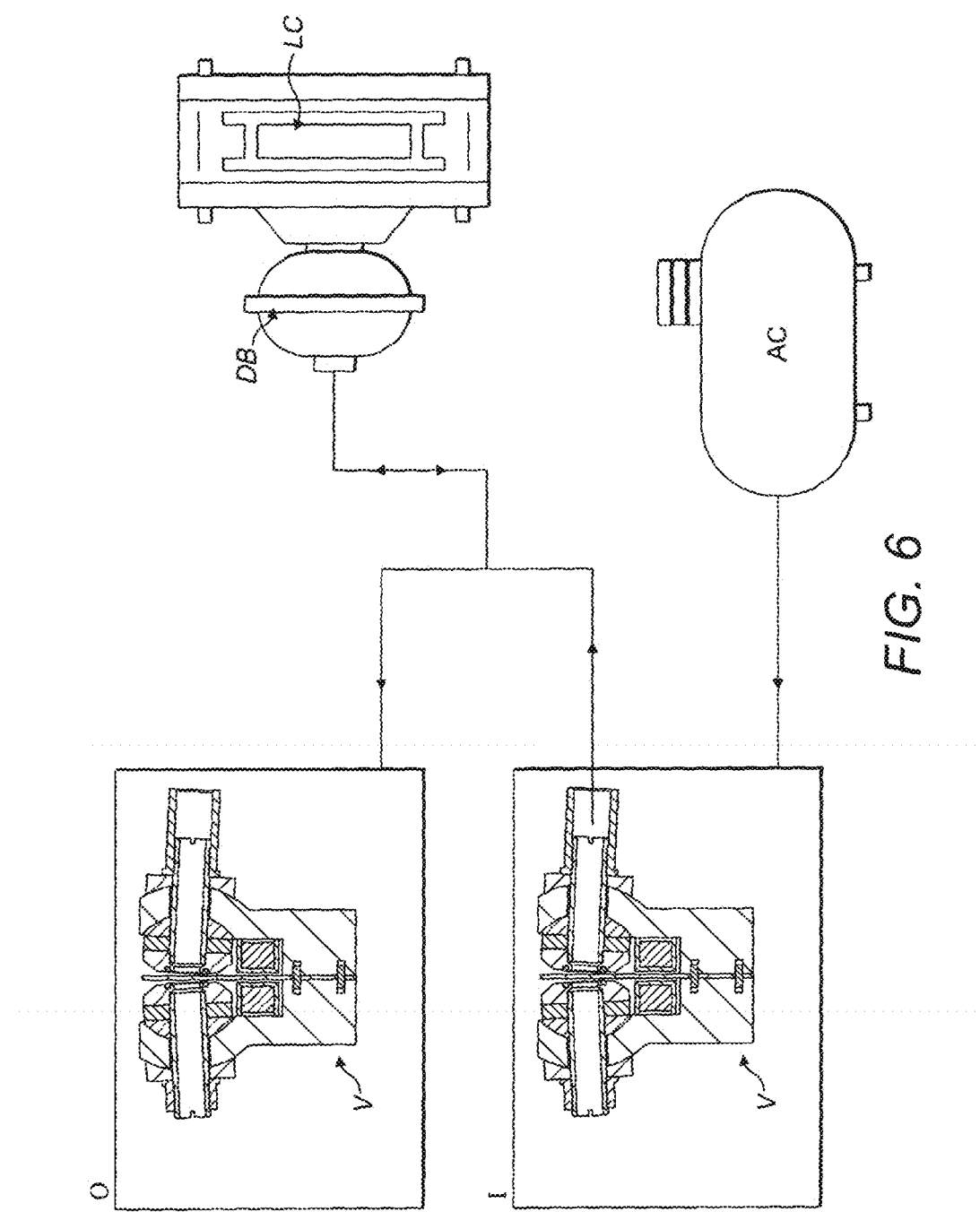
FIG. 6 schematically shows a valve configuration for pneumatic brakes.

Two valves V according to FIG. 3 were fabricated for the use in an experimental airbrake system according to the diagram shown schematically in FIG. 6. The system comprises a disk brake DB and a load cell LC. The arrows indicate the direction of airflow supplied by an air compressor AC, through an inlet I and an outlet O of the system. The valves V were used to control the compressor pressure at the inlet I and the chamber pressure at the outlet O. Finite element simulations suggested that the flexure 40 would have a natural frequency of 575 Hz and a stress at the root of the cantilever of 497 MPa, which is less than the endurance limit of the design material. In addition, the simulations suggested that the flexure 40 hold force would be 140 N. Attempts were made to observe the valve switching under an applied upstream pressure. However, it was discovered that for a flat flexure 40 made of EN42 spring steel, the maximum upstream pressure under which the valve could switch was not 12 bar, but 3 bar. In other words, despite meeting all of the mechanical requirements, a conventional, flat flexure 40 made from EN42 spring steel could not meet the magnetic requirements for the valve. Magnetic stainless steel materials were also tried for the flexure, but resulted in lower switching pressures. This was despite the valve having adequate hold force and flexure stiffness when tested.

Considering the reasonable hold force and flexure stiffness displayed by the valve, it was theorized that the coil was not altering the magnetic hold force as much as was originally expected. However, this did not explain what aspect of the magnetic design would have to be modified to improve switching. To resolve the problem, an experimental design optimization of the valve was performed in concert with a theoretical analysis based on magnetic circuit theory.

The mechanism behind the magnetization of materials is well known in the art. As the strength of the magnetic field applied to the material is increased, small magnetic domains within the material that initially have random orientations become aligned with the applied field. Eventually, all of the domains become aligned with the applied field. At this point, the material is saturated and responds like free space to any further increase in the applied magnetic field strength. Since the core is now indistinguishable from the outside air, most of the additional magnetic flux leaks through the air.

Figure 7:
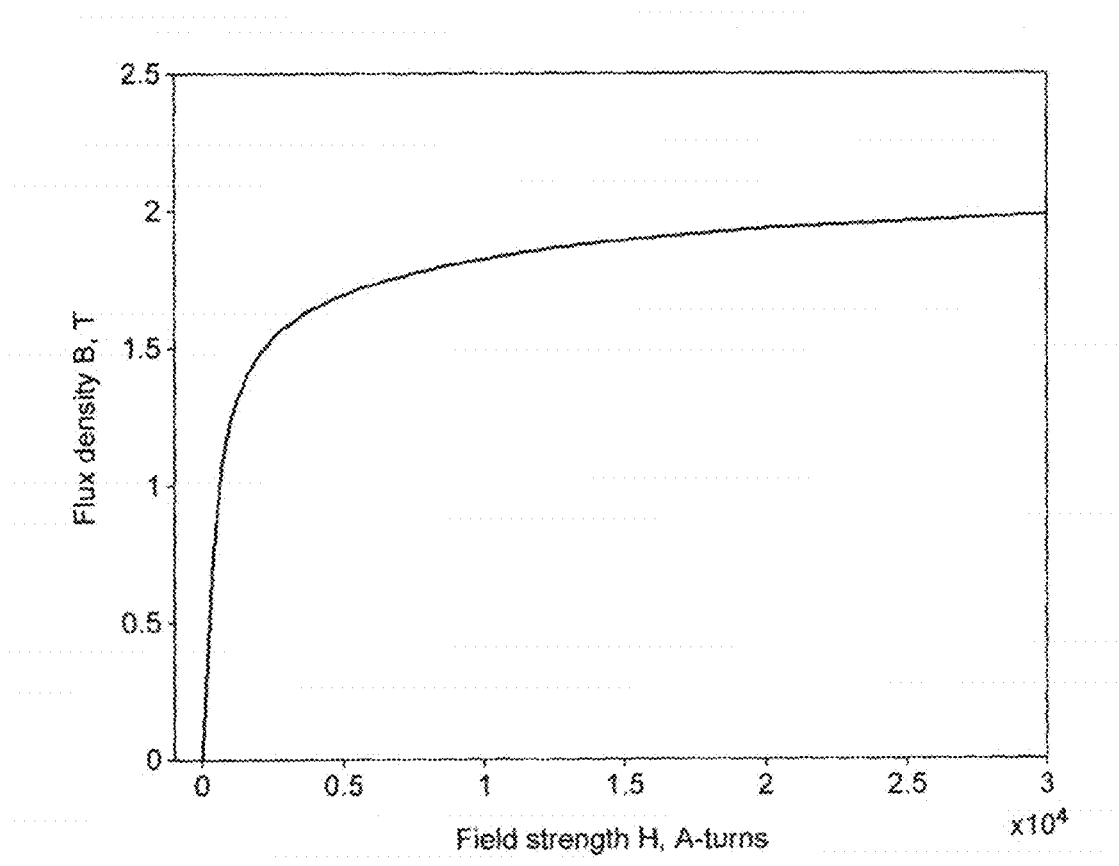
FIG. 7 shows a B-H curve for rolled cold steel.

The saturation phenomenon is commonly illustrated through the use of B-H curves, which plots flux density vs. magnetization. The B-H curve used in the theoretical analysis of the flexure is shown in FIG. 7. The relative permeability of the material, $\mu_r$, is the local slope of the B-H curve at a given magnetic field strength, and gives an indication of how much flux can be passed through the material at a given level of magnetization. It is commonly assumed in the art that $\mu_r$ is a constant value, with the value taken near the origin of the B-H plot. This is approximately valid at low values of flux density in the material, but not for high values of the flux density, where the local slope is reduced. Simulations of the valve indicated that the rectangular flexure shown in FIG. 3 was saturated when it was close to the pole-pieces.

Figure 8:
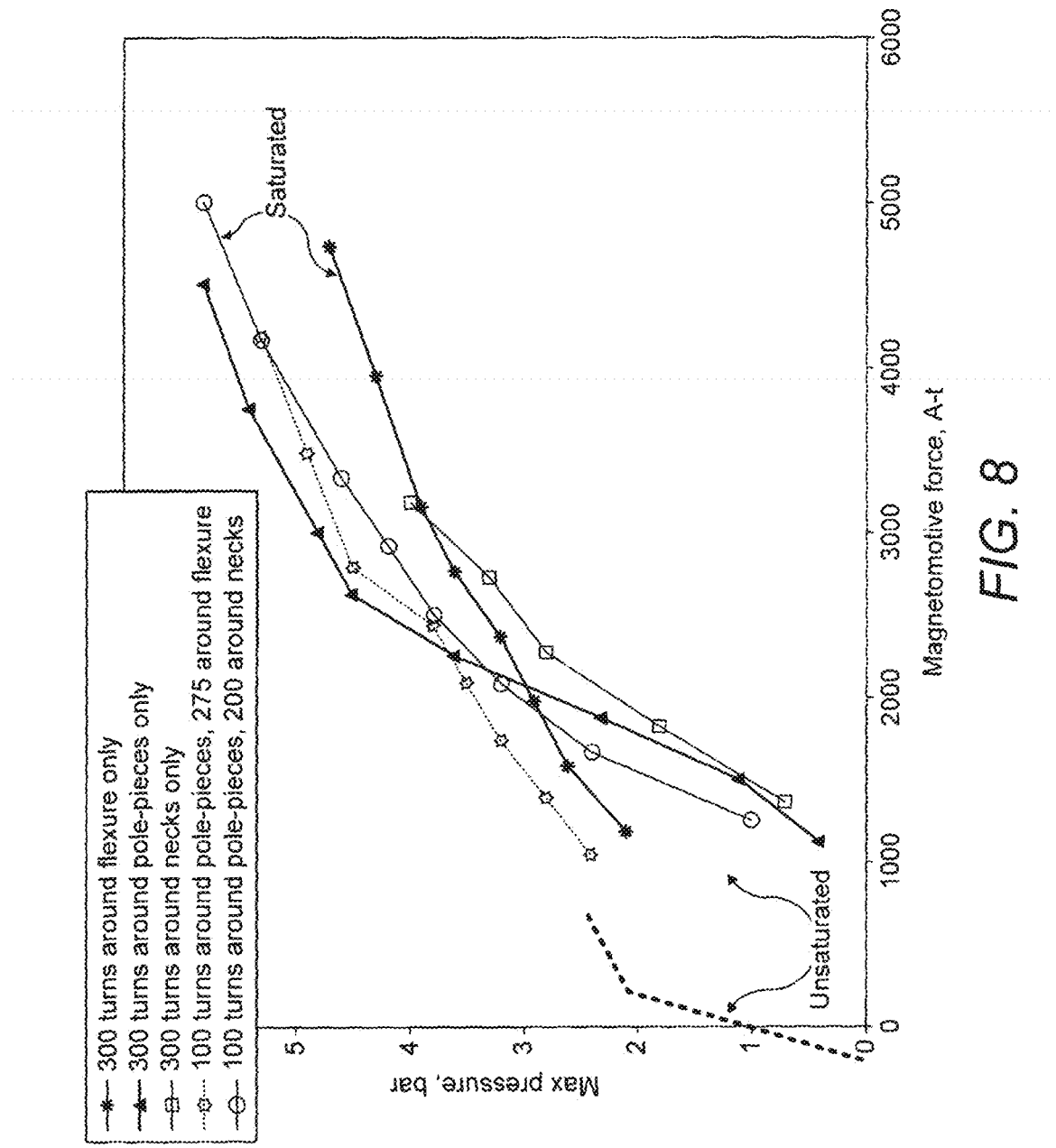
FIG. 8 is a graph showing the maximum switching pressure for different coil configurations during static tests.

Several parameters were investigated to optimize the flow of flux through the valve, but only the coil and the flexure are discussed here for brevity, since changing other parameters did not produce significant results. A suite of tests was performed to evaluate the performance of different coil configurations. The configurations examined included winding coils in series around the flexure; around the pole-pieces; around the neck of the yoke; and combinations of these arrangements. Each configuration was tested for increasing currents, capturing the effect of increasing the magnetomotive force on the hold force. Results of the tests are shown in FIG. 8. The currents were derived from the voltage input to the coil and the resistance of the coil, which was measured before and after each test.

Two distinct trends are seen in the results of FIG. 8: one for configurations that included a coil wound around the flexure, and one for configurations that included a coil wound around the pole-pieces or inline with the magnet. When the coil was wound around the flexure, for example the curves labelled "300 Turns Around Flexure Only," higher switching pressures were typically encountered at lower magnetomotive forces compared to when there was no coil around the flexure. However, winding the coil around the pole-pieces appears to have facilitated higher switching pressures at higher magnetomotive forces, for example the curve labelled "300 Turns Around Pole-Pieces Only." In this case, a clear saturation of the maximum pressure occurs for a magnetomotive force of approximately 2500 Ampere-turns.

The magnetic circuit simulation suggested that winding the coil around the flexure is the most efficient arrangement with respect to re-routing the flow of flux to facilitate a change of state of the valve. This is because winding the coil around the flexure effectively short-circuits the flow of flux between the two permanent magnets. But, FIG. 8 indicates that the flexure saturates at low magnetomotive forces with the coil wound around it (a dotted line is drawn on FIG. 8 showing the expected point of saturation for these coil configurations). According to the magnetic circuit simulation, winding the coil around the pole-pieces is less efficient than winding it around the flexure. However, with the coil located in series with the permanent magnets, it is postulated that the coil is able to oppose the flow of flux generated by the magnets directly. Consequently, flux leakage is less of a factor and more of the energy from the coil may be directed to overcoming the permanent magnets, explaining the higher switching pressures found in FIG. 8 for coils in series with the magnets at higher magnetomotive forces. Some of this flux is still routed through the flexure, though, which eventually saturates.

By increasing the MMF and changing the coil locations, the switching pressure was increased to 6 bar from the initially attained value of 3 bar. The 6 bar maximum switching pressure achieved with the best coil configuration was still well below the target design pressure of 12 bar, though. Moreover, the switching pressure was achieved for a magnetomotive force of 4500 A·t, which translates into a current of 22.5 A for a 200 turn coil. Given the 0.5 mm diameter of the wire used, the currents could not be raised much further to achieve higher switching pressures without melting the coil. Changes to other parameters were therefore investigated to improve the valve's performance. These investigations are described below.

To increase the amount of flux that can be channeled through the flexure, its cross-sectional area would have to be increased. Looking at equation (1), the flexure stiffness relates linearly to its width and cubically to its thickness. It follows that increasing the width of the flexure would have a much smaller effect on the stiffness than increasing the thickness. This smaller effect would in turn minimize the amount of extra magnetic force needed to fight the stiffness. However, the width of the flexure is more than 20 times the thickness in the embodiment shown in FIG. 3. Consequently, increasing the width of the flexure by just a small amount to raise the cross-sectional area would have a significant effect on the physical envelope of the valve when compared to increasing the thickness. Thicker flexures increase the magnetic flux, but also increase the mechanical stiffness and hence the necessary magnetic hold force. The research was therefore directed towards inventing a flexure that is effectively thicker in strategic areas, substantially separating its mechanical functionality from the primary magnetic functionality responsible for switching the flexure from one state to the other.

The investigation was performed by taking a normal flexure and attaching 1.1 mm thick "slivers" of mild steel to it using tape. The slivers were short enough that they sat between the pole-pieces and the back of the yoke, and the bonding was flexible enough that the slivers did not significantly affect the flexure's stiffness. The tests evaluating the maximum switching pressure that were described previously were then re-run with approximately 15 A sent to 100 turn and 200 turn coils wound around the new flexure configurations.

Figure 9:
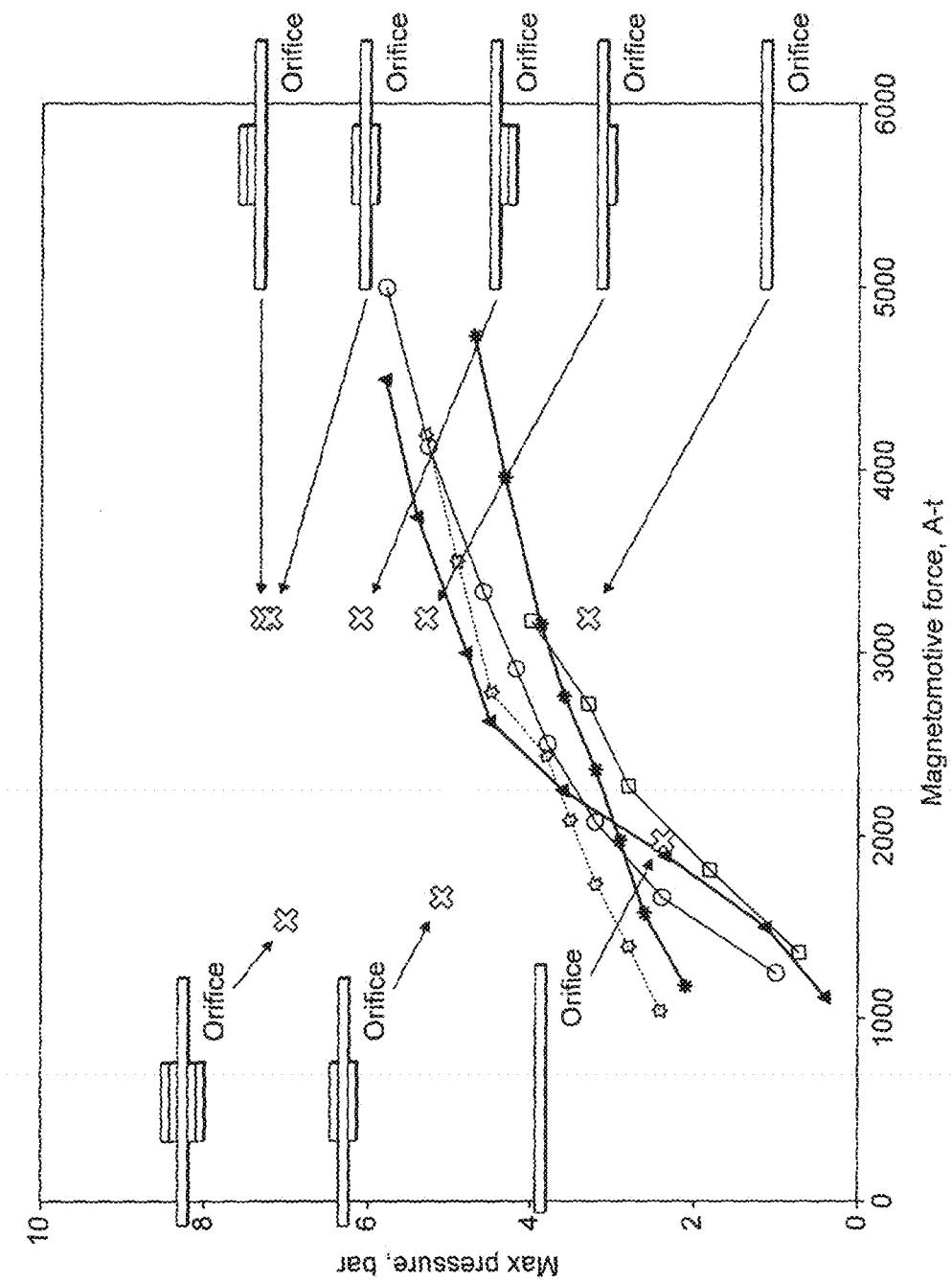
FIG. 9 is a graph showing the maximum switching pressure for different flexure thicknesses and coil configurations during static tests.

Results from the tests are plotted over results from the tests for the different coil configurations in FIG. 9. It is clear that thickening the flexure between the pole-pieces and the back of the yoke had a far more dramatic effect on the maximum switching pressure than optimizing the coil configuration, with the pressure increasing by 100% over the best coils. A peculiar result is that thickening the flexure on the opposite side of the orifice had a greater effect than thickening the flexure on the same side of the orifice. This is counterintuitive, since the opposite pole-piece is over 1 mm away from the flexure, and one would expect the majority of the flux to try to travel through the adjacent pole-piece to the slivers on the flexure. But, thickening the side opposite the orifice brings the slivers within range of the magnetic attraction of the other pole-piece, encouraging the flexure to switch to the other state.

New flexure arrangements were designed that would "thicken" the flexure in a magnetic sense without making it thicker in a mechanical sense (i.e. without making it stiffer). Four such designs are shown in FIGS. 10A to 10D.

Figure 10A:
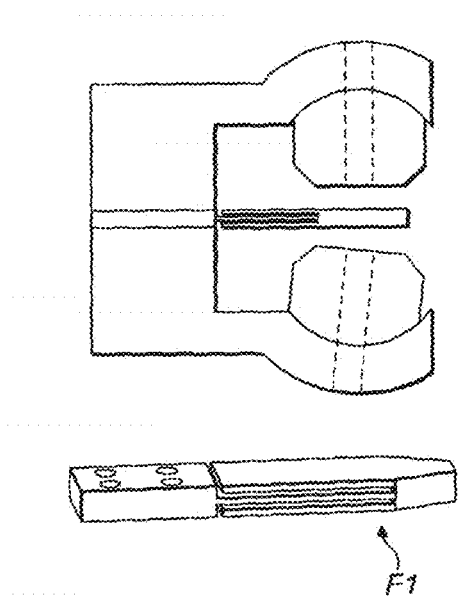
FIGS. 10A to 10D show alternative flexure designs which may be used in a valve according to the present invention.

The first design, in FIG. 10A, involves adding "fingers" to the flexure F1 such that the mechanical stiffness, which is predominantly dictated by the thickness of the flexure at its root, remains similar to the original flexure design. The fingers are shown in FIG. 10A as being an integral part to the original, flat, rectangular portion of the flexure F1, but they may also be separate parts attached to the flexure, to simplify manufacture or to allow the use of different materials. The basic section of the central flexure element has a thickness of 1.30 mm and a width of 30 mm. The fingers in this embodiment each have thicknesses of 1.075 mm, with a 1 mm air gap separating the fingers from the main body of the flexure and a small air gap (<0.5 mm) separating the fingers from the back of the yoke when the flexure is deflected. Because this gap is small, it can still be crossed easily by the magnetic flux. The thickness of the fingers was limited by the need to fit the entire valve in the previously built pressure chambers. It will be appreciated that these are exemplary dimensions of this embodiment of the flexure and that the dimensions for other embodiments of this design may vary. FEA simulations suggested that the deflection force of the flexure would be 120 N when touching an orifice (decreased from 150 N for the flat, completely rectangular flexure), the associated stress at the root would be 530 MPa, and the natural frequency would be 356 Hz. Although the natural frequency was reduced, it was still above the minimum 333 Hz required by the specifications shown in FIG. 4.

Figure 10B:
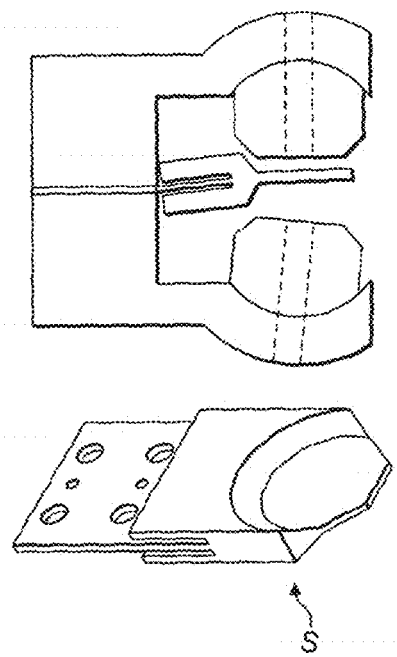

The second design, shown in FIG. 10B, adds a scallop to the flexure S such that the flexure S "hugs" a pole-piece and better directs the flux. Once again, the fingers and the scallop are shown to be integral with the original, flat portion of the flexure in FIG. 10B, but may also be made as separate parts attached to the flexure. The thickness of the clamped section was also reduced to that of the 1.30 mm thick central flexure element. Since the valve would now easily fit in the pressure chambers, the fingers were thickened to 2.1 mm each, retaining their original 1 mm spacing from the central flexure element and 0.5 mm spacing from the back of the yoke when deflected. It will be appreciated that these are exemplary dimensions of this embodiment of the flexure and that the dimensions for other embodiments of this design may vary. The deflection force of the flexure S was predicted to be 120 N when touching the O-ring, while the stress at the root and the natural frequency were simulated to be 432 MPa and 550 Hz respectively.

Figure 10C:
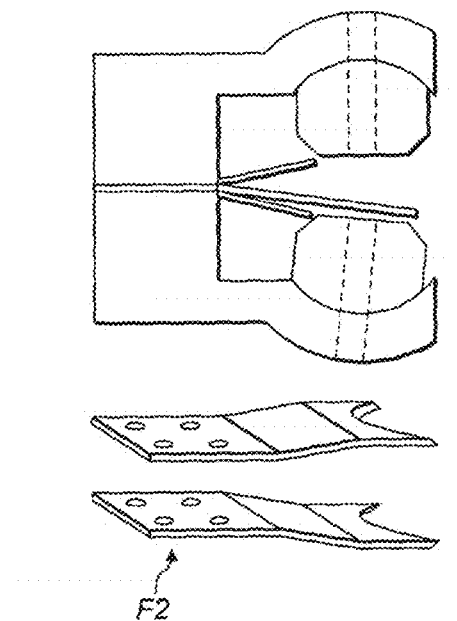

The third design, shown in FIG. 10C, decouples the fingers F2 from the flexure entirely. In this design, 2.1 mm thick, static mild steel fingers F2 were clamped between the flexure and yoke, with scallops at the end of the fingers so they hugged the pole-pieces. It will be appreciated that these are exemplary dimensions of this embodiment of the flexure and fingers, and that the dimensions for other embodiments of this design may vary. Shims may be placed between the flexure and the fingers to separate the two, allowing for free motion at the root of the flexure, thereby minimally affecting its stiffness. Moreover, the fingers may be carefully bent such that they barely touched the flexure along its length when it was deflected.

Figure 10D:
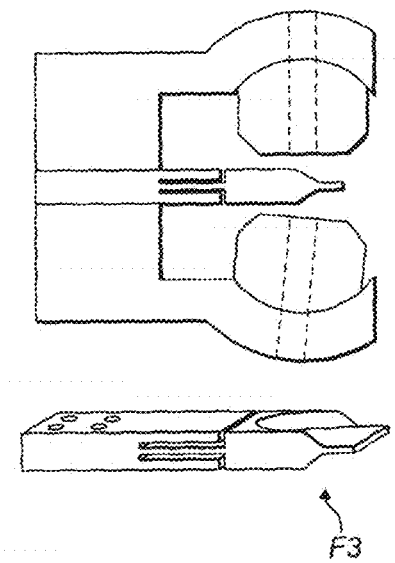

The fourth design, shown in FIG. 10D, has additional fingers oriented in the opposite direction to the ones in FIGS. 10A and 10B. A small air gap between the fingers and the thickened end of the flexure F3 allows the flow of magnetic flux, but the mechanical stiffness is close to that of a flexure without the fingers. The fingers may be integral parts of the original, flat portion of the flexure, as shown in FIG. 10D, or they may be made as separate parts attached to the flexure.

Figure 11A:
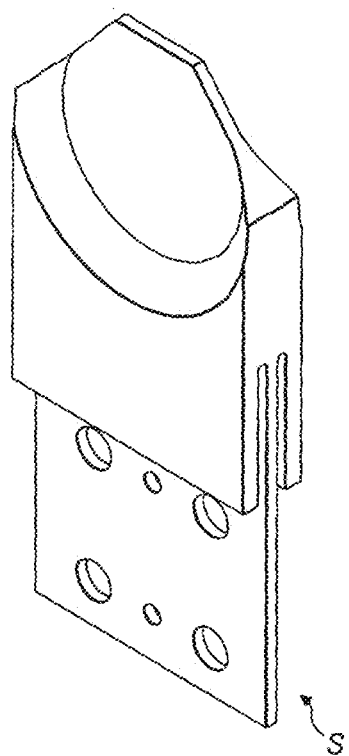
FIG. 11A shows a perspective view of a scalloped flexure design.
Figure 11B:
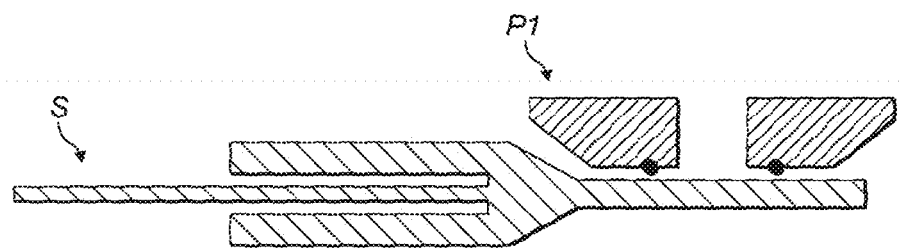
FIG. 11B shows a frontal view of a scalloped flexure design, including a frontal view of pole pieces above the flexure.

The second design as shown in FIG. 10B, the flexure S with a scallop, looked the most promising from a theoretical point of view, since the scallop would provide a large amount of area where flux could be transferred from a pole-piece to the flexure. It follows that it was decided to fabricate that design while running preliminary tests with the third design. A detailed representation of the scalloped design shown in FIG. 10B is shown in FIGS. 11A (in perspective view) and 11B (frontal view). The frontal view of FIG. 11B shows the scalloped flexure S placed below a polepiece P1. The pole-piece P1 is formed of one part, and is shown in section view so that the orifice can be seen. The preferred material for making the scalloped flexure may be EN42 spring steel, however other materials may be used.

Speed tests run with the scalloped flexure shown in FIGS. 10B and 11 showed that the valve took 2.5-3 ms to switch states. Tests to determine the maximum switching pressures were run with both the flexure S featuring a scallop (FIG. 10B), and the design featuring fingers F2 clamped between the flexure and the yoke (FIG. 10C). The results are plotted on top of the results for different coil configurations in FIG. 12.

Figure 12:
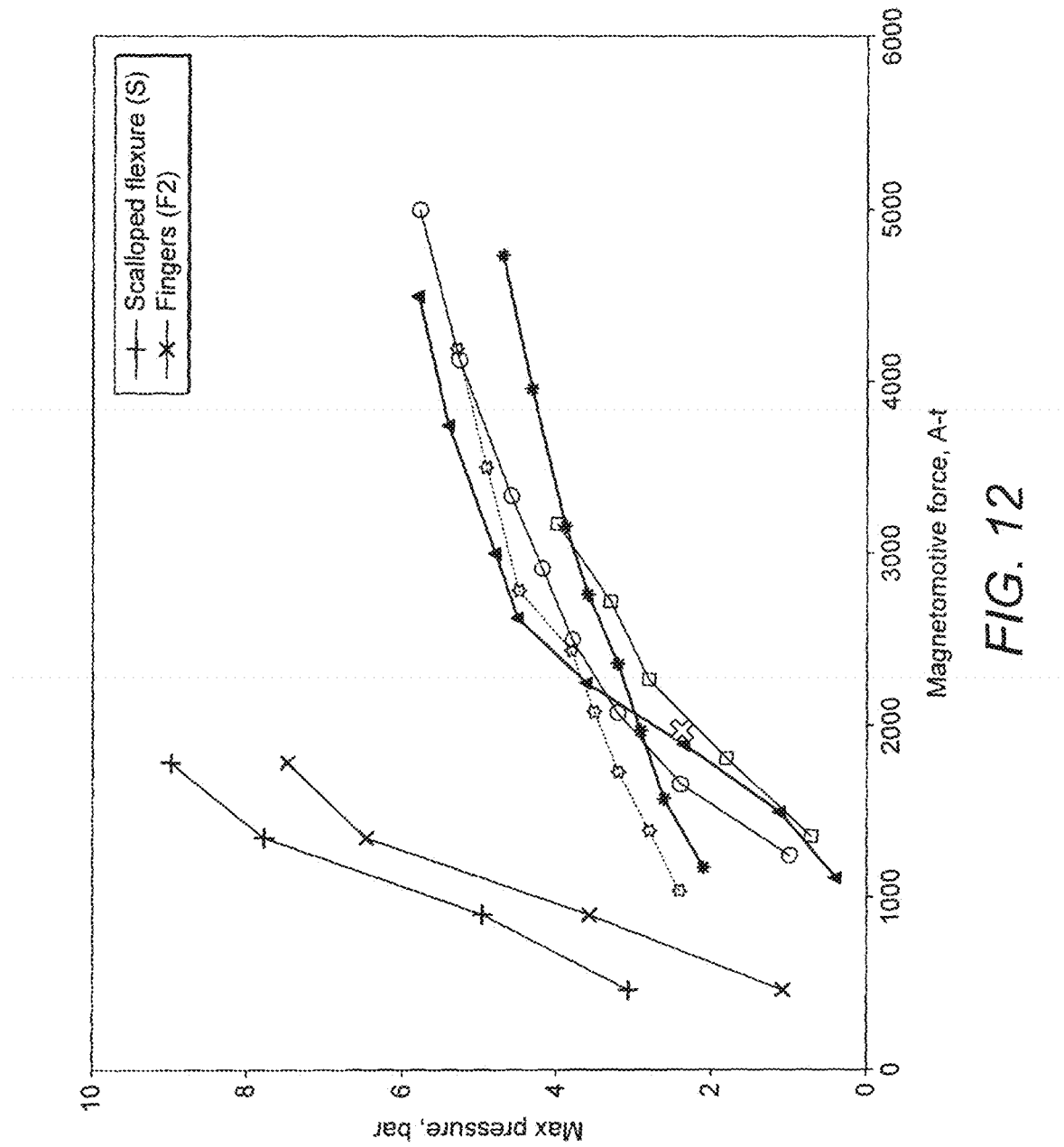
FIG. 12 is a graph showing the maximum switching pressure for different flexure and coil configurations during static tests.
Figure 13A:
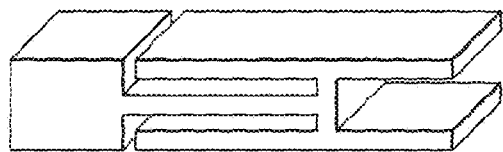
FIGS. 13A to 13G show a number of other possible flexure designs which may be used in a valve according to the present invention.
Figure 13B:
Figure 13C:
Figure 13D:
Figure 13E:
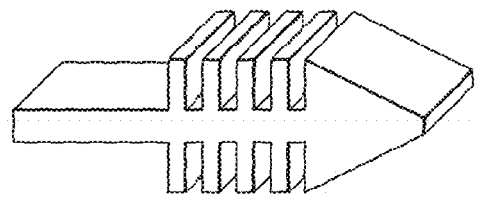
Figure 13F:
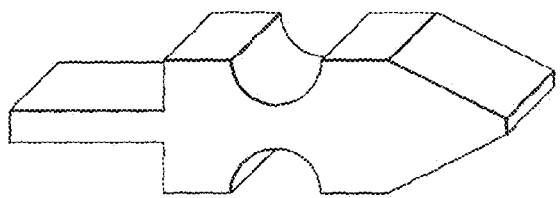
Figure 13G:
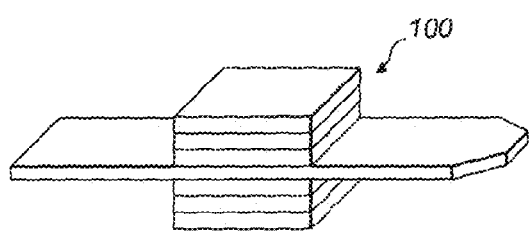

FIG. 12 shows that the design with clamped fingers F2 increased the switching pressure by 4.3 bar over the best coil configurations, while the scalloped flexure S performed even better, increasing the switching pressure by 5.8 bar over the best coil configurations. These test results further confirmed the previous deduction that the steeper gradient of the switching pressure vs. magnetomotive force curves occurs when there is no saturation of the flexure. Although FIG. 12 only shows test results up to 9 bar, it is conceivable that the 12 bar design pressure initially specified for the valve could be achieved by the scalloped flexure S with a higher magnetomotive force.

The valve according to the present invention may be used in many applications requiring rapid switching on and off of the flow of a liquid or gas. These include air brakes, pneumatic and hydraulic actuators, and other applications where rapid switching of a fluid flow (and optionally pulse-width modulation) can be used to control mechanical systems.

FIGS. 13A to 13G show a number of possible flexure designs that may be used, in addition to those shown in FIGS. 10 and 11, in a valve according to the current invention. The design shown in FIG. 13G includes slivers 100 of magnetic material connected to the central flexure such that they do not constrain the central flexure from bending.

Figure 14A:
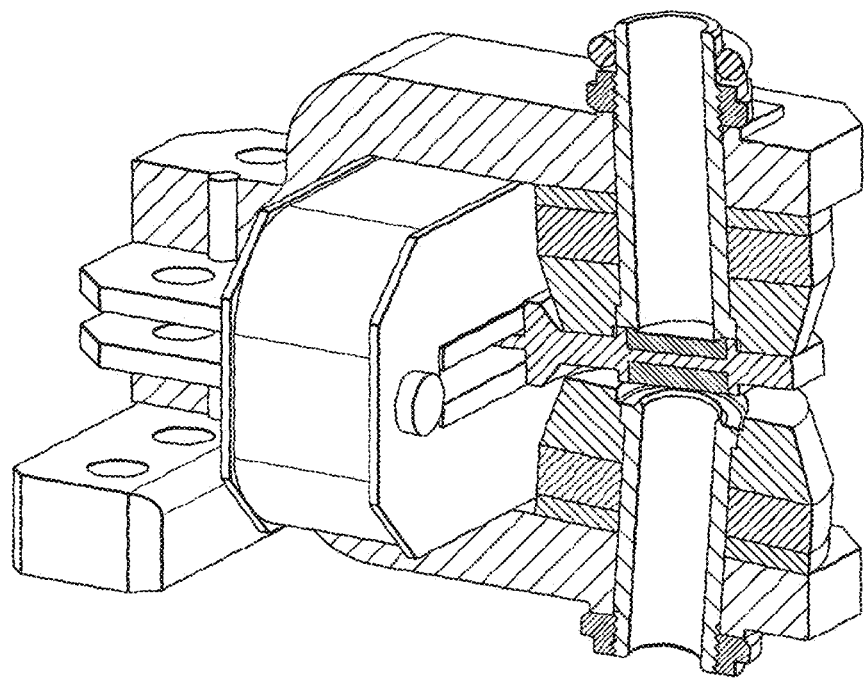
FIGS. 14A to 14C show a further possible design according to the invention.
Figure 14B:
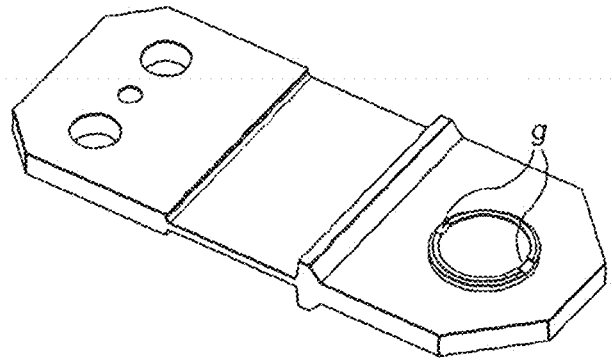
Figure 14C:
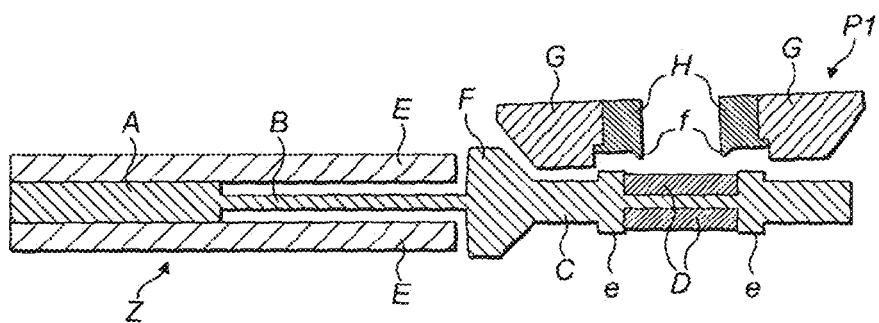

FIGS. 14A to 14C show a further flexure design in accordance with the present invention. FIG. 14C shows a section view of the flexure and pole-piece. The flexure Z has a clamped portion A; a resilient portion B; a flat portion C; and a seat D. In addition, the flexure Z has fingers E; and a magnetic coupling to the fingers F. Similar to FIG. 10D, the fingers E protrude from the clamped region of the flexure. This reduces the mass of moving part of the flexure compared to flexure S, therefore increasing its natural frequency according to equation (5). The portions of the fingers E adjacent to the clamped portion A of the flexure are also clamped, and the portions of the fingers E adjacent to the resilient portion B of the flexure are not clamped. All components A-E may be manufactured integrally, but may also be made as separate parts attached to each other. Making components A-E as separate parts would allow individual consideration for magnetic permeability, mass, corrosion resistance, strength, and ease of manufacture of each of the parts, as well as the flexure as a whole.

In the design shown in FIGS. 14A to 14C, the flat portion and seat are separated by annular protruding element e. This element may be attached, or integrally formed with either the flat portion or the seat. At least one protruding element e may be used on either side of the flat portion. In addition, the pole-piece P1 in this design is formed of a magnetic portion G; and a non-magnetic portion H. The non-magnetic portion H includes another protruding element f, which may be attached to, or integrally formed with the non-magnetic portion H of the pole-piece. Protruding element f may press into the rubber element, creating a seal. Advantageously, the diameter of this seal would only be as large as the orifice diameter, and consequently smaller than the diameter of a seal created by a rubber O-ring integrated into the pole-piece (for example, FIG. 11B). The smaller diameter seal would lower the pressure force according to equation (3), and as FIG. 2C shows, a lower pressure force would require lower magnetomotive force from the coil to cause the flexure to switch states.

The height of the protruding element e on the flat portion C of the flexure may be dimensioned to provide stress relief on the rubber seal, by limiting the amount the protruding element f on the pole-piece presses into the rubber. The height of protruding element e on the flexure may be used to adjust the air-gap between the flat portion C of the flexure and the pole-piece face when the valve is in a given state. Preventing metal-to-metal contact between the flat portion and the pole-piece face, by including a small air-gap, can significantly reduce the magnetic hold force, and therefore the magnetomotive force required by the coil to switch states. It should be noted that in this embodiment of the valve, the protruding element e does not make a magnetic circuit with the non-magnetic portion of the pole-piece H when they touch each other.

The protruding element e may include one or more "slots" g, as shown in FIG. 14B, in order to vent air in the small annular volume created between the protruding element e on the flexure and the protruding element f on the pole-piece when the valve is closed.

The thickness of the flat portion C of the flexure in FIGS. 14A to 14C is preferably dimensioned so that it carries the required flux without saturating, and without compromising the mass and dynamic properties of the flexure. The thickness was 3.5 mm in this embodiment of the flexure. The thickness of the resilient portion B of the flexure is designed to achieve a given resilient mechanical force, and was 1.16 mm in this embodiment of the flexure. The thickness of the fingers E is designed to prevent magnetic saturation of the flexure, and was 2.35 mm in this embodiment of the flexure. The thickness of the clamped portion A of the flexure is designed to provide clearance between the main resilient portion B and the fingers E. This thickness was 3.4 mm in this embodiment of the flexure. It will be appreciated that these are exemplary dimensions of this embodiment of the flexure and that the dimensions for other embodiments of this design may vary. Suitable values may be selected using equations (1-7).

In summary, the flexure, Z, in FIGS. 14A to 14C has an improved seat design, benefits from unnecessary material being removed, and is formed of multiple parts, which results in improved manufacturability, reduced size and reduced weight, while providing a larger hold force but smaller switching current (magnetomotive force). This design gives substantially improved switching performance.

Figure 15:
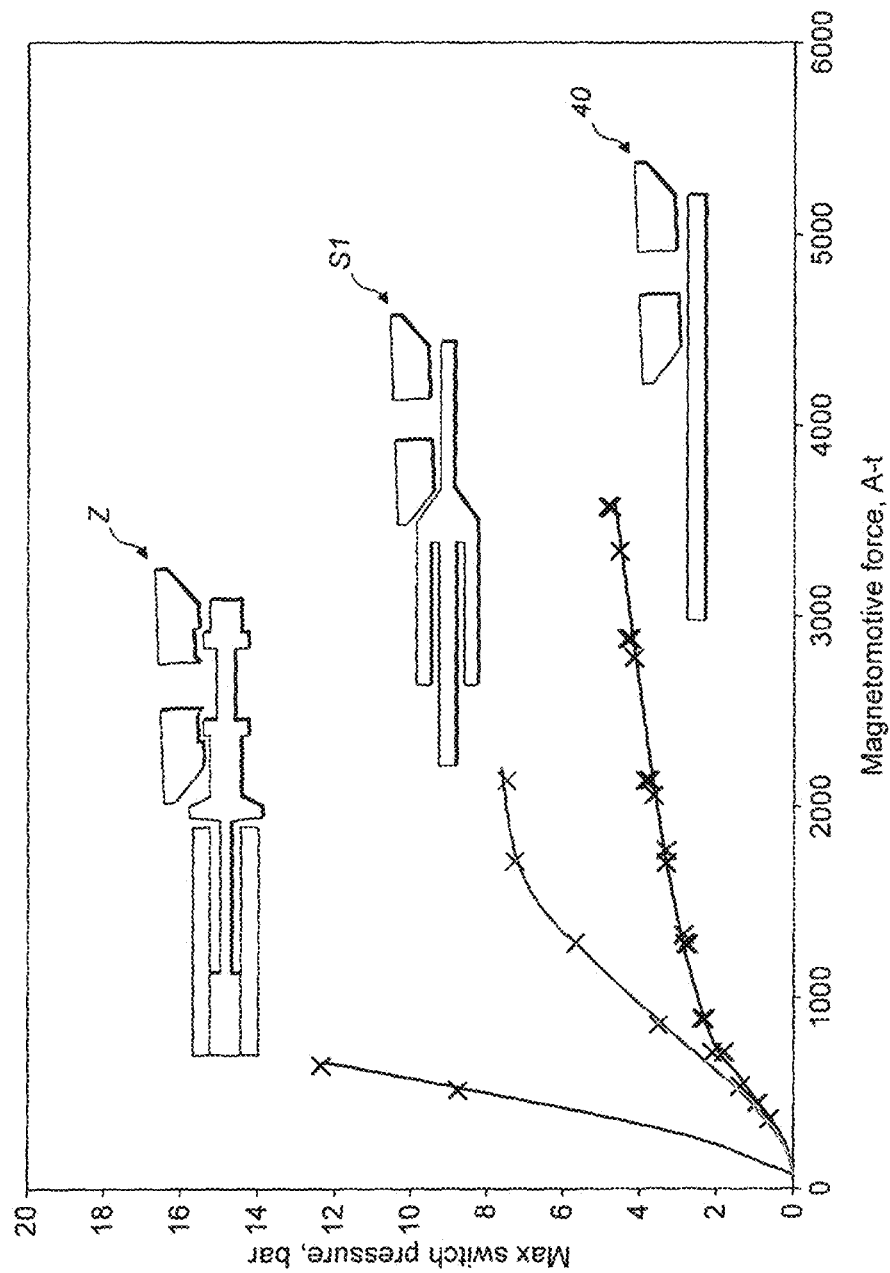
FIG. 15 is another graph which shows the maximum switching pressure for different flexure and coil configurations during static tests.

FIG. 15 shows test results (switching pressure vs. magnetomotive force curves) for three type of flexures: the flexure Z as shown in FIGS. 14A to 14C, a "flat," standard flexure 40, a scalloped flexure S1 (of the type shown in FIGS. 10B and 11). It may be seen from FIG. 15 that, at a magnetomotive force of 700, flexure Z increased the switching pressure by approximately 10 bar compared to the scalloped flexure S and the "flat," standard flexure 40.

Although FIGS. 10A-D, 11A,B, 13A-G and 14A-C give a sample of possible flexure shapes that can be used, it will be appreciated that the flexures according to the current invention are not limited to the physical forms shown in those figures.

What is claimed is:
1. An electromagnetic valve comprising:
    a yoke;
    a magnet having pole pieces defining a pole piece gap; and
    a flexure assembly having one end attached to the yoke, such that part of the flexure assembly extends into the pole piece gap, the flexure assembly having at least one resilient portion formed of a resilient material and at least one magnetizable finger having a portion that is separated from the resilient portion by an air gap, wherein the part of the flexure assembly that extends into the pole piece gap is movable between the pole pieces through an intermediate position towards which it is resiliently biased such that a resilient mechanical force is generated by deflecting the resilient portion from an undeflected position;

wherein the magnet provides a magnetic force that attracts the part of the flexure assembly that extends into the pole piece gap towards one of the pole pieces, thereby defining a valve state;

wherein the at least one magnetizable finger and the resilient portion of the flexure assembly are configured such that the magnetic force defining the valve state is greater than the resilient mechanical force; and wherein the at least one magnetizable finger increases the magnetic force provided by the magnet on the flexure assembly without significantly affecting a stiffness of the flexure assembly.

2. The electromagnetic valve according to claim 1, wherein the at least one magnetizable finger has a proximal end coupled to the resilient portion.

3. The electromagnetic valve according to claim 2, wherein the at least one magnetizable finger has a distal end separated from the resilient portion by the air gap.

4. The electromagnetic valve according to claim 3, wherein the proximal end of the at least one magnetizable finger is coupled to the part of the flexure assembly that extends into the pole piece gap, such that the distal end of at least one magnetizable finger is proximate an end of the flexure assembly attached to the yoke.

5. The electromagnetic valve according to claim 3, wherein the proximal end of the at least one magnetizable finger is coupled to an end of the flexure assembly attached to the yoke such that the distal end of at least one magnetizable finger is proximate the part of the flexure assembly that extends into the pole piece gap.

6. The electromagnetic valve according to claim 1, wherein the part of the flexure assembly that extends into the pole piece gap is of greater thickness than the resilient portion.

7. The electromagnetic valve according to claim 1, further comprising at least one resilient element attached to or integrally formed with the part of the flexure assembly that extends into the pole piece gap.

8. The electromagnetic valve according to claim 7, wherein the resilient element is contained inside at least one protruding element on the part of the flexure assembly that extends into the pole piece gap.

9. The electromagnetic valve according to claim 8, wherein the protruding element on the part of the flexure assembly that extends into the pole piece gap includes at least one slot.

10. The electromagnetic valve according to claim 7, wherein at least one of the pole pieces includes a protruding element that can press into the resilient element, creating a seal.

11. The electromagnetic valve according to claim 10, wherein the protruding element on the part of the flexure assembly that extends into the pole piece gap limits an amount the protruding element on the at least one of the pole pieces presses into the resilient element.

12. The electromagnetic valve according to claim 1, wherein at least one of the pole pieces is made from separate parts of different magnetic permeabilities.

13. The electromagnetic valve according to claim 1, wherein at least one of the pole pieces comprises an orifice housed in a through-tube.

14. The electromagnetic valve according claim 1, wherein the flexure assembly comprises a scallop at the part of the flexure assembly that extends into the pole piece gap.

15. The electromagnetic valve according to claim 1, wherein the part of the flexure assembly that extends into the pole piece gap comprises at least one protruding element and wherein at least one of the pole pieces comprises at least one recess for receiving the at least one protruding element.

16. The electromagnetic valve according to claim 15, wherein the at least one protruding element engages the at least one of the pole pieces such that a gap exists between the at least one magnetizable finger and the at least one of the pole pieces in the valve state.

17. The electromagnetic valve according to claim 1, wherein the flexure assembly consists of a single part.

18. The electromagnetic valve according to claim 1, wherein the flexure assembly comprises more than one part.

* * * * *